United States Patent [19]

Yang

[11] Patent Number: 4,955,593
[45] Date of Patent: Sep. 11, 1990

[54] POSITION AND ANGLE OF POLAR COORDINATE ADJUSTABLE VICE

[76] Inventor: Tai-Her Yang, 5-1 Taipin St., Si-Hu Town, Dzan-Hwa, Taiwan

[21] Appl. No.: 413,297

[22] Filed: Sep. 27, 1989

[51] Int. Cl.$^5$ .............................................. B23Q 1/04
[52] U.S. Cl. ...................................... 269/71; 269/79; 269/246; 269/258
[58] Field of Search ...................... 269/79, 71, 73, 69, 269/45, 258, 246

[56] References Cited

U.S. PATENT DOCUMENTS

| | | | |
|---|---|---|---|
| 2,458,370 | 1/1949 | Geddes | 269/45 |
| 2,502,784 | 4/1950 | Fahlander | 269/79 |
| 2,550,629 | 4/1951 | Welz | 269/79 |
| 2,564,566 | 8/1951 | Duffy | 269/79 |
| 3,107,908 | 10/1963 | West | 269/79 |

Primary Examiner—Robert C. Watson
Attorney, Agent, or Firm—Leonard Bloom

[57] ABSTRACT

An adjustable angle vice that is movably adjustable in four different directions or coordinates. The vice has an upper frame, including clamping faces carried thereby, that is carried by a base frame. The upper frame is pivotably joined to the base frame for pivotal movement of the upper frame in a pivotal direction. The upper frame is further joined to the base frame, so that the upper frame sliding moves relative to the base frame in a first horizontal direction. The base frame is rotatably carried by an upstanding rod, so that the vice, including the upper frame, may be rotationally moved in a rotational direction. The rod is slidingly joined to the base frame, so the the vice, including the upper frame may be slidingly moved in a second horizontal direction. Finally, rotational movement of the rod also vertically moves the upper frame in a vertical direction.

4 Claims, 5 Drawing Sheets

POSITION AND ANGLE OF POLAR COORDINATE ADJUSTABLE VICE

FIELD OF THE INVENTION

The present invention relates to adjustable angle vices and, in particular, to adjustable angle vices that are simultaneously adjustable in a plurality of directions for positioning and working on a workpiece.

BACKGROUND OF THE INVENTION

Vices for clamping workpieces often utilize drills that are driven along longitudinal axes of the drill. With such drills (except during heavy-duty working), the workpieces are held steady with manpower while the drill itself is moved horizontally. Use of such an arrangement can be quite limited, especially when large or irregularly shaped workpieces are involved.

Other devices of which I am aware include two-way vices that provide for positive positioning of a vice in two coordinates.

SUMMARY OF THE INVENTION

The object of the present invention is the provision of an adjustable angle vice that may be moved in a plurality of different directions (coordinates) for the clamping and moving of a workpiece.

It is a further object of the present invention to provide such an adjustable angle vice that may be moved in pivotal and rotational directions (coordinates), as well as in a first horizontal direction (coordinate) and a second horizontal direction (coordinate).

It is a still further object of the present invention to provide such an adjustable angle vice that may further move in a vertical direction (coordinate), so as to provide for horizontal adjustability of the vice.

The present invention relates to a vice having a frame that includes an upper frame is carried by the base frame for sliding horizontal movement of the upper frame relative to the base frame in a first horizontal direction (coordinate). The upper frame is further pivotally joined to the base frame for pivotal movement of the upper frame relative to the base frame in a pivotal direction (coordinate). The frame is also carried on a threaded upstanding rod (mandrel screws) for rotational movement of the frame in a rotational direction (coordinate). This rod is further slidably received in the frame for sliding horizontal movement of the frame in a second horizontal direction (coordinate). Rotation of the upstanding rod also permits vertical movement of the vice in a vertical direction (coordinate), so that the vice may be selectively raised and lowered, for adjusting the height thereof.

In accordance with the teachings of the present invention there is disclosed an adjustable angle vise for clamping a workpiece. This vice includes the combination of a base frame having a pair of substantially parallel longitudinal trackways formed therein. An upper frame is supported by the base frame. The upper frame includes at least one pair of clamping faces. At least one of said clamping faces is movable toward the other for the selective clamping and unclamping of workpiece therebetween. A pair of sliding pivots are rotatably carried by the upper frame, such that the upper frame pivots about the sliding pivots for pivotal movement of the upper frame and the clamping faces carried thereby in a pivotal direction (coordinate). Each of the sliding pivots is further slidingly received in respective trackways of the base frame, such that the upper frame is supported by the base frame, and further such that the upper frame and the clamping faces carried thereby are horizontally slidably movable for sliding movement of the upper frame and the clamping faces carried thereby in a first horizontal direction (coordinate). A pair of lateral struts having respective first ends are provided. The first ends of the struts are pivotally secured to the base frame at respective pivot points for pivotal movement of the struts about the pivot points relative to the base in response to the pivotal movement of the upper frame including the clamping faces carried thereby. Each of the lateral struts has a respective trackway formed therein. A pair of slides are provided. Each slide is received through one of the respective trackways formed in the lateral struts and is fixed to the upper frame. In this fashion, the slides freely slide in the trackways of the struts when the upper frame is pivoted, and the slides aid in fixing and securing the upper frame in the pivoted position selected. The base frame further has a third longitudinal trackway formed therein. A foot plate is received on and secured to the support. An upstanding rod having a vertical axis is also provided. This rod includes a lower end and an opposite upper end having a rotatable lug carried thereon. The rod is positioned, such that the lug is received in the third longitudinal trackway being seatded therein. In this manner, the base frame and the upper frame carried thereby are horizontally slidably movable for further sliding movement of the upper frame and the clamping faces carried thereby in a second horizontal direction (coordinate). The lower end of the rod is rotatably carried by the foot plate for rotational movement of the rod about the vertical axis. In this fashion, the base frame and the upper frame carried thereby are rotatably carried by the rod for rotational movement of the upper frame including the first and second clamping faces carried thereby in a rotational direction (coordinate).

DESCRIPTION OF PREFERRED EMBODIMENTS

Figure 1:
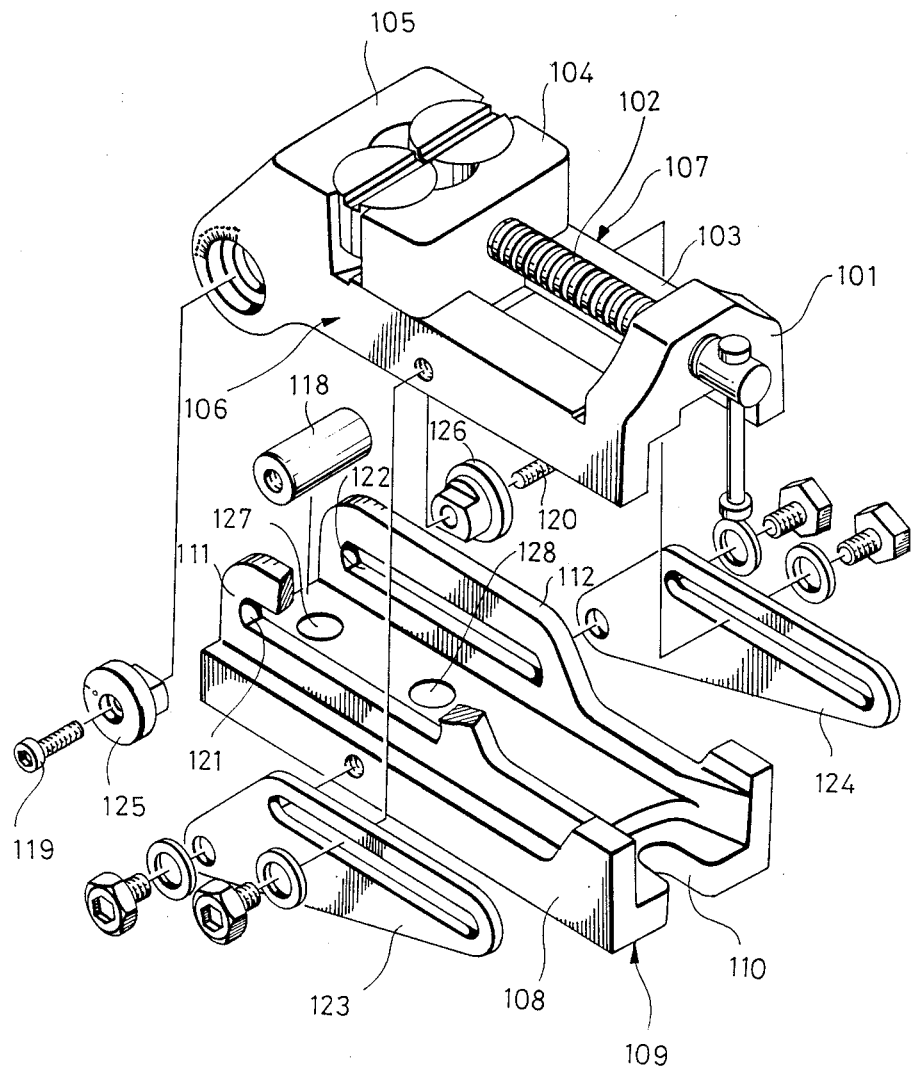
FIG. 1 is an exploded perspective view of a first embodiment of the adjustable angle vice of the present invention.

With reference now to the drawings, the adjustable angle vice of the present invention includes an upper frame 101 and a base frame 108. The upper frame 101 is supported by the base frame 108 for simultaneous movement in rotational, pivotal, two horizontal and vertical directions (coordinates), as will be discussed at length below.

The upper frame 101 includes at least one first and one second clamping surface 104 and 105, respectively. At least one of the said clamping surfaces 104 and 105 is movable towards the other of said clamping surfaces for the selective clamping and unclamping of workpiece therebetween. The clamping faces 104 are slidably horizontally moved with the use of guide rod 102 and slide rails 103. The upper frame further includes substantially parallel vertical side walls 106 and 107 in which respective sliding pivot apertures are formed.

The base frame 108 includes a lower portion 109. Holes or grooves 110 are formed in a forward end of the lower portion 109 for optional fixing (securing) of the base frame 108 to a support by use of, for example, bolts.. Upwardly-extending parallel longitudinal arms 111 and 112 are formed on both sides of the base frame 108. Each of the arms 111 and 112 has a respective, substantially parallel, longitudinal trackway 121 and 122, respectively, formed therein.

A pair of sliding pivots 125 and 126 are rotatably carried by the upper frame 101, such that the upper frame 101 pivots about the sliding pivots 125 and 126 for pivotal movement of the upper frame 101, and the clamping faces 104 and 105 carried thereby, in a pivotal direction (coordinate ) relative to the base frame 108. Each of the sliding pivots 125 and 126 is slidingly received in a respective trackway 121 and 122, respectively, of the base frame 108. In this fashion, the upper frame 101 and the clamping faces 104 and 105 are horizontally movable relative to the base frame 108 in a first horizontal direction (coordinate). Also in this fashion, the upper frame 101 is supported and carried by the base frame 108.

The sliding pivots 125 and 126 are further received in the respective sliding pivot apertures formed in the side walls 106 and 107. Positioned thusly, the pivots 125 and 126 may be selectively adjustably tightened and loosened by use of bolts 119 and 120, that are rotatably received in a lateral shaft 118 located between the wings 111 and 112. This tightening secures the upper frame 101 into a selected pivoted position. Loosening of the bolts 119 and 120 permits pivoting of the upper frame 101 in the pivotal direction (coordinate) relative to the base frame 108, as described above.

Disposed on either side of the frames 101 and 108 are a pair of lateral struts 123 and 124. Struts 123 and 124 have respective first ends that are pivotally secured to the base frame 108 at respective pivot points. This provides for pivotal movement of the struts 123 and 124 in a pivotal direction relative to the base frame 108 about the pivot points in response to the pivotal movement of the upper frame 101 including the clamping faces 104 and 105 carried thereby in the pivotal direction (coordinate). Each of said struts 123 and 124 has a respective trackway formed therein.

A pair of slides (bolts) are provided. Each slide is received through one of the respective trackways formed in the struts 123 and 124 (with the respective heads thereof preventing the disengagement of the slides from the respective trackways) and is fixed (bolted) to the upper frame 101 at a location that is spaced from the sliding pivots 125 and 126. In this fashion, the slides freely slide in the trackways of the struts 123 and 124 when the upper frame 101 is pivoted in the pivotal direction (coordinate). Also in this fashion, the slides aid in fixing and securing the upper frame 101 in the pivoted position selected.

Figure 2:
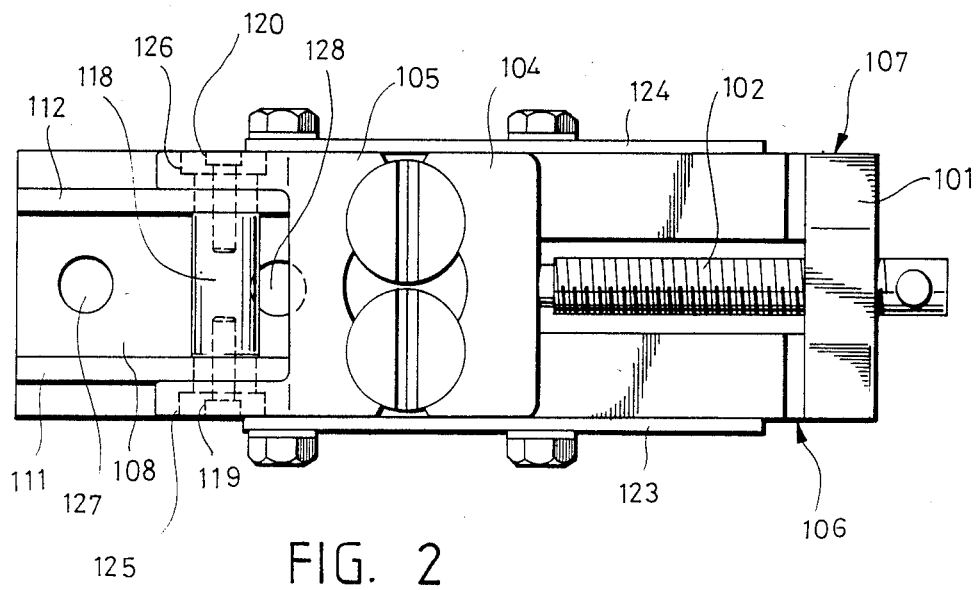
FIG. 2 is a top view of the vice of FIG. 1.
Figure 3:
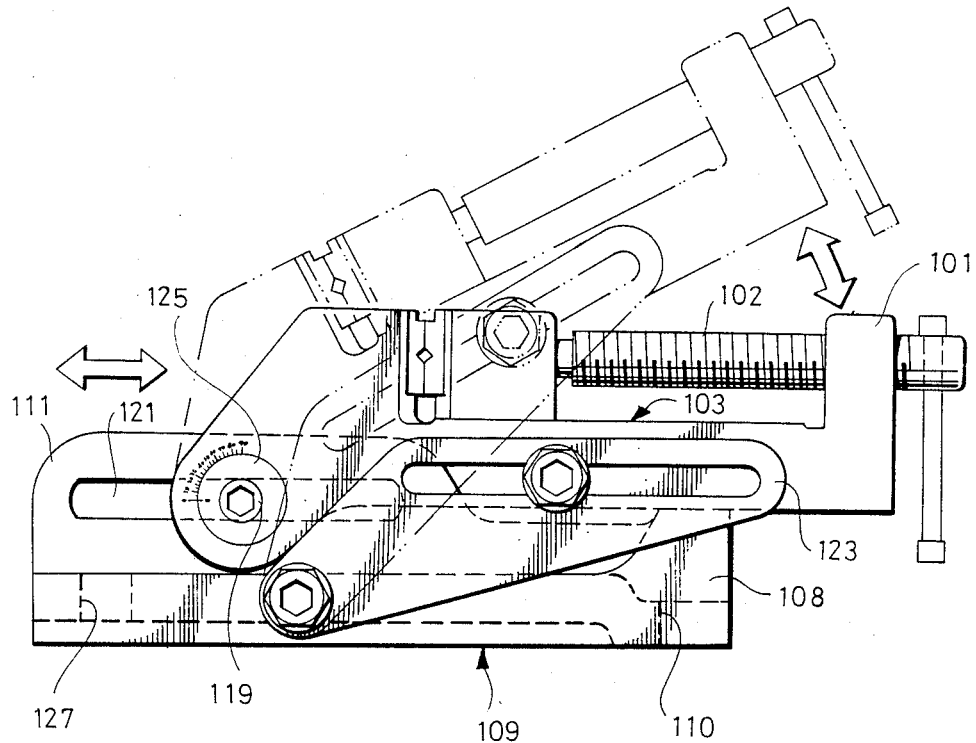
FIG. 3 is a side view of the vice of FIG. 1 illustrating, in phantom lines the pivotal movement of the upper frame relative to the base frame in a pivotal direction (coordinate).

Finally, apertures (axle holes) 127 and 128 may be formed in the base frame 108 for securing the base frame 108 to a support, as will be discussed at length below (FIGS. 1-3). Alternatively, a third longitudinal trackway is formed in the base frame 108 for securing the base frame 108 to a support, as well will be discussed below (FIG. 4-6).

Figure 4:
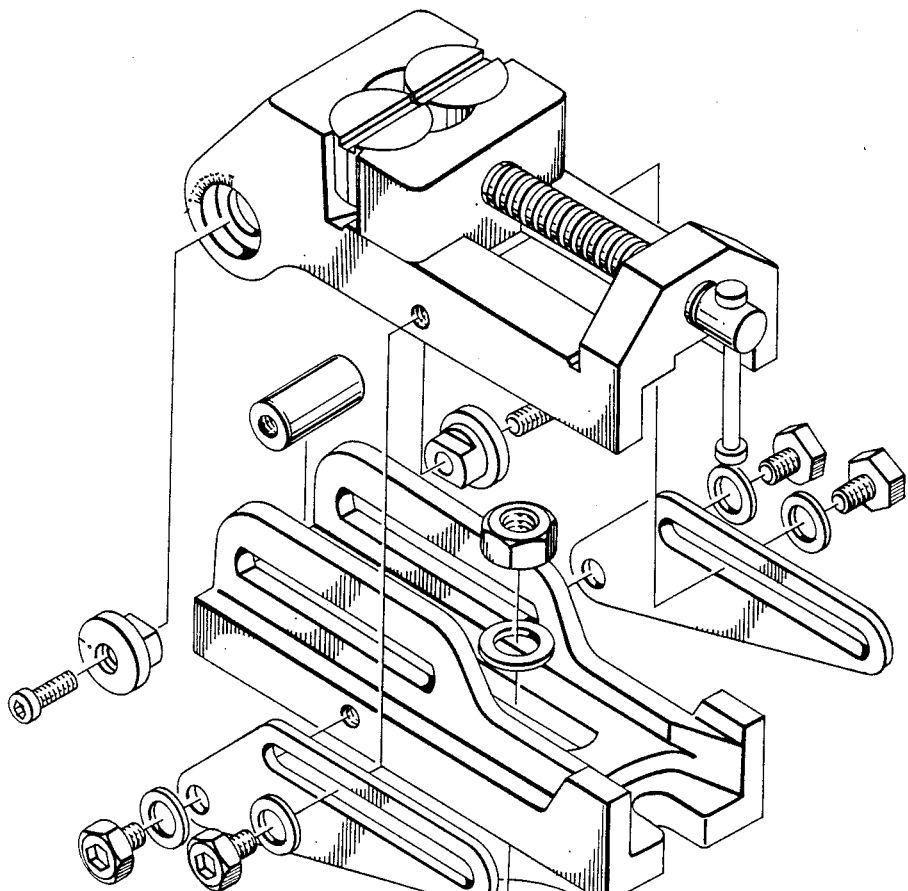
FIG. 4 is an exploded perspective view of a second embodiment of the adjustable angle vice of the present invention.
Figure 5:
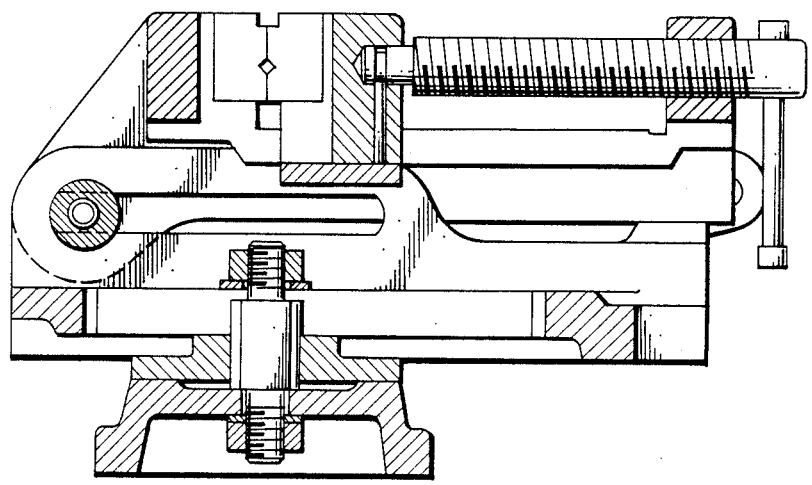
FIG. 5 is a side view, in cross-section of the vice of FIG. 4.
Figure 6:
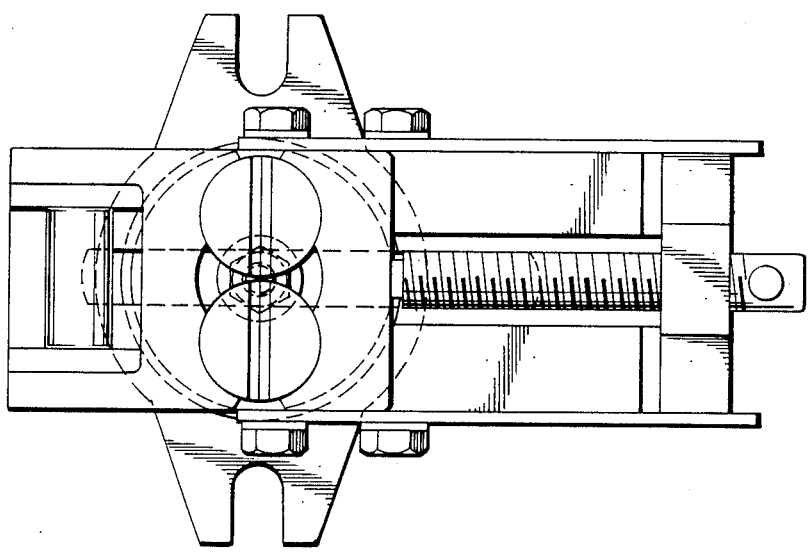
FIG. 6 is a top view of the vice of FIG. 4, with portions thereof shown in phantom lines for the sake of clarity.

With reference now to FIG. 4-6, means is provided and described for securing the vice to a suitable support, such as a table. Preferably, the means permits for the vice and, in particular for the upper frame 101 and the clamping faces 104 and 105 carried thereby, to be rotationally moved in a rotational direction (coordinate) in a horizontal plane. In this fashion, the upper frame 101, including the clamping faces 104 and 105 carried thereby, may be rotationally adjusted and positioned.

The means for securing the vice to a support includes a foot plate that is received on and secured to a support by any suitable means, such as bolts. The foot plate includes an upstanding internally-threaded boss formed therein.

An upstanding externally-threaded rod having a vertical axis is provided. This rod includes a lower end, an upper and an enlarged nut portion located at substantially the upper end of the rod. The threads of the rod mutually-engage the threads of the boss, so that the lower end of the rod is rotatably received in the threaded boss and carried by the foot plate for rotational movement in the rotational direction. It is noted that rotational movement of the rod in the rotational direction about the vertical axis raises and lowers the height of the rod in the foot plate.

The upper end of the rod is secured or joined to the base frame 108 at either the apertures 127 or 128 (FIGS. 1-3) or the third longitudinal trackway formed in the base frame 108 (FIG. 4-6).

Use of the rotatable lug in the apertures 127 or 128 permits rotational movement of the rod in a rotational direction (coordinate) while the vice does not rotate. This permits the vertical height of the vice to be adjusted. Alternatively, the use of the lugs permits rotational movement of the vice, including the upper frame 101 and the clamping faces 104 and 105 carried thereby, in the rotational direction (coordinate) while the rod remains stationary. In this manner, the vice may be selectively rotationally moved in a rotational direction (coordinate), so that the desired rotational positioning of the vice may be achieved without substantially altering the vertical height of the vice.

Use of the rotatable lug in the third longitudinal trackway of the base frame 108 permits sliding movement of the upper frame 101, including the clamping faces 104 and 105 carried thereby, in a second horizontal direction (coordinate). In this arrangement, the upper end of the rod is received through the third trackway and the lug is slidingly seated therein. This permits the base frame 108 and the upper frame 101, including the clamping faces 104 and 105 carried thereby, to be sliding moved in a second horizontal direction (coordinate). In this fashion, the positioning of the clamping faces 104 and 105 may be selectively moved and adjusted along two different horizontal directions (coordinates).

It is preferred to equip the vice with various indicia, so that the amount of movement of the vice and, in particular, of the upper frame of the vice, may be visually indicated. In this respect, indicia is formed on the sliding pivots 125 and 126 and the upper frame 101 that interact for visually indicating the pivotal position of the upper frame 101 including the clamping faces 104 and 105 carried thereby. Further in this respect, the foot plate and the rod have indicia formed thereon that interact for visually indicating the rotational position of the upper frame 101, including the clamping faces 104 and 105 carried thereby.

Figure 7:
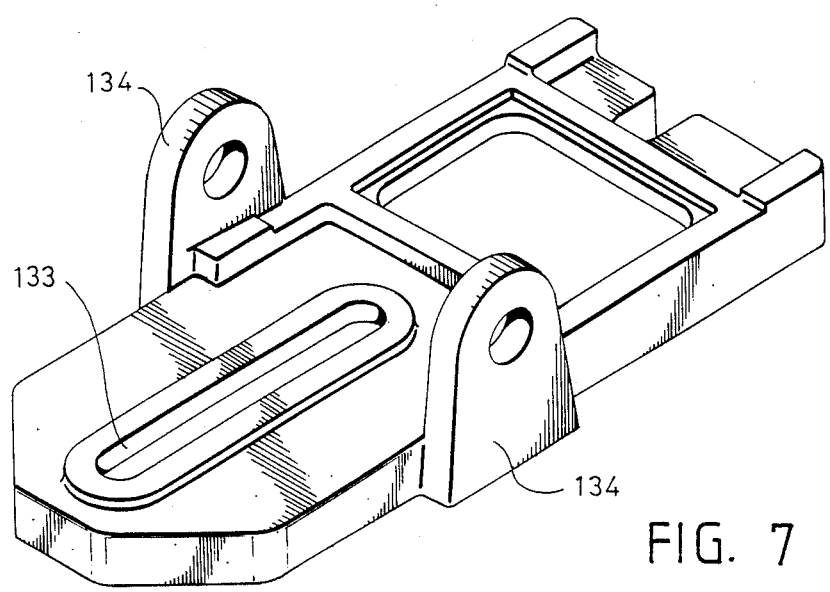
FIG. 7 is a perspective view of a base frame that may be employed in the vice of the present invention.
Figure 8:
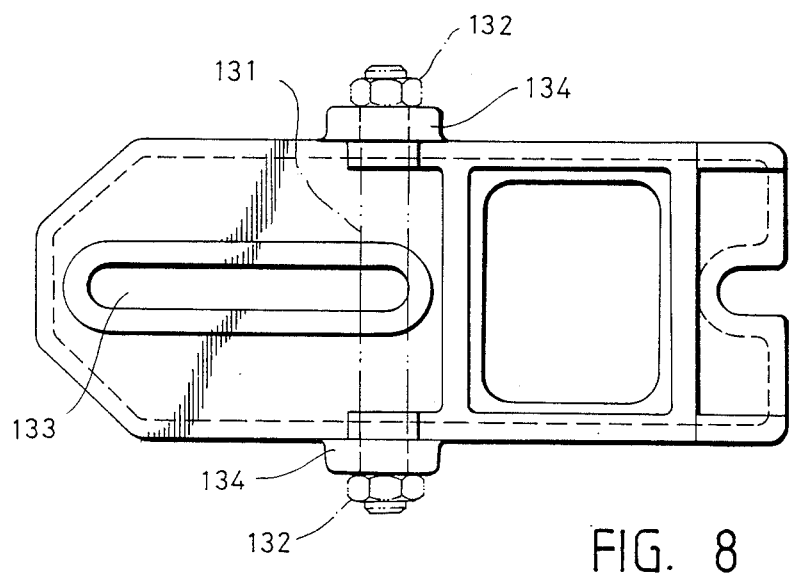
FIG. 8 is a top view of the base frame of FIG. 7.
Figure 9:
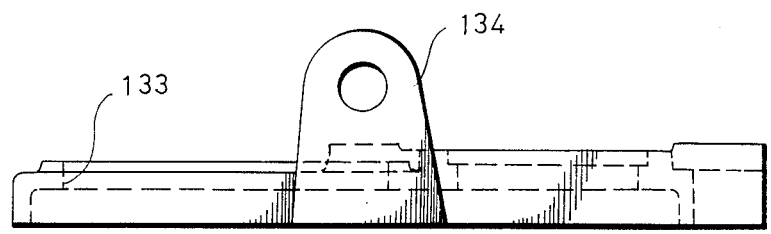
FIG. 9 is a side view of the base frame of FIG. 7.

With references now to FIGS. 7-9, an alternative arrangement for a base frame is disclosed, which base frame permits the upper frame, including the clamping faces carried thereby, to pivotally move in a pivotal direction (coordinate). In this embodiment, the sliding pivots 125 and 126 in the trackways 121 and 122, respectively, are eliminated. The pivots 125 and 126 are replaced by a pair of parallel ears 134 having respective aligned apertures formed therethrough. A bolt 131 is disposed so as to be received through the sliding pivot holes formed in the upper frame and the aligned apertures formed in the respective ears 134. The bolt 131 is then held in place by nuts 132. The upper frame can then pivotally move in a pivotal direction (coordinate) about the bolt 131, the longitudinal axis of which also defines the pivot point. The trackway 133 formed in the base frame provides for the sliding movement of the upper frame in a horizontal direction (coordinate) in the same manner as the third trackway described above with reference to FIGS. 4-6.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. An adjustable angle vise for clamping a workpiece, in combination, comprised of:
   - a base frame having a pair of substantially parallel longitudinal trackways formed therein;
   - an upper frame supported by the base frame, the upper frame including at least one pair of clamping faces, at least one of said clamping faces being movable toward the other for the selective clamping and unclamping of workpieces therebetween;
   - a pair of sliding pivots being rotatably carried by the upper frame, such that the upper frame pivots about the sliding pivots for pivotal movement of the upper frame and the clamping faces carried thereby in a pivotal direction, each of the sliding pivots further being slidingly received in respective trackways of the base frame, such that the upper frame is supported by the base frame, and further such that the upper frame and the clamping faces carried thereby are horizontally slidably movable for sliding movement of the upper frame and the clamping faces carried thereby in a first horizontal direction;
   - a pair of lateral struts having respective first ends, the first ends of the struts being pivotally secured to the base frame at respective pivot points for pivotal movement of the struts about the pivot points relative to the base in the second plane in response to the pivotal movement of the upper frame including the clamping faces carried thereby, each of said lateral struts having a respective trackway formed therein;
   - a pair of slides, each slide received through one of the respective trackways formed in the lateral struts and fixed to the upper frame, such that the slides freely slide in the trackways of the struts when the upper frame is pivoted, and further such that the slides aid in fixing and securing the upper frame in the pivoted position selected;
   - the base frame further having a third longitudinal trackway formed therein;
   - a foot plate for being received on and secured to the support;
   - an upstanding rod having a vertical axis, said rod including a lower end and an opposite upper end having a rotatable lug carried thereon, the rod positioned with the lug being received in the third longitudinal trackway, so that the base frame and the upper frame are carried thereby, and further so that the base frame and the upper frame are horizontally slidably movable for further sliding movement of the upper frame and the clamping faces carried thereby in a second horizontal direction, the lower end of the rod being rotatably carried by the foot plate for rotational movement of the rod about the vertical axis, so that the base frame and the upper frame carried thereby are rotatably carried by the rod for rotational movement of the upper frame including the first and second clamping faces carried thereby in a rotational direction.

2. The combination of claim 1, further comprised of:
   the sliding pivots and the upper frame further having indicia thereon for visually indicating the pivotal position of the upper frame including the clamping faces carried thereby.

3. The combination of claim 1, further comprised of:
   the foot plate and the rod having indicia thereon for visually indicating the rotational position of the upper frame including the clamping faces carried thereby.

4. The combination of claim 1, further comprised of:
   the lower end of the rod being externally-threaded; and
   the foot plate having a boss formed thereon, the boss being internally-threaded for threadably matingly engaging the threaded lower end of the rod, such that the rod is rotatably carried by the support, whereby rotation of the rod in the boss vertically moves the rod for vertical movement of the vice including the upper frame and the clamping faces carried thereby in a vertical direction.

* * * * *